(12) United States Patent
Rowe

(10) Patent No.: US 6,678,210 B2
(45) Date of Patent: Jan. 13, 2004

(54) FREQUENCY DIVISION BEAMFORMING FOR SONAR ARRAYS

(75) Inventor: Francis D. Rowe, San Diego, CA (US)

(73) Assignee: Rowe-Deines Instruments, Inc., San Diego, CA (US)

(*) Notice: Subject to any disclaimer, the term of this patent is extended or adjusted under 35 U.S.C. 154(b) by 0 days.

(21) Appl. No.: 10/232,812

(22) Filed: Aug. 28, 2002

(65) Prior Publication Data

US 2003/0214880 A1 Nov. 20, 2003

Related U.S. Application Data

(60) Provisional application No. 60/315,579, filed on Aug. 28, 2001.

(51) Int. Cl.[7] ............................................... G01S 15/06
(52) U.S. Cl. ........................................ 367/103; 367/102
(58) Field of Search ................................. 367/102, 103

(56) References Cited

U.S. PATENT DOCUMENTS 3,419,845 A * 12/1968 Thiede et al. ............... 367/103
3,794,964 A * 2/1974 Katakura .................... 367/102
5,923,617 A 7/1999 Thompson et al. ......... 367/103

* cited by examiner

Primary Examiner—Daniel T. Pihulic
(74) Attorney, Agent, or Firm—Knobbe Martens Olson & Bear LLP

(57) ABSTRACT

A sonar array for forming multiple transmit and/or receive acoustic beams by a frequency beamforming technique. In frequency division beamforming, beam steering direction is made a function of frequency by driving (receiving) each element of a uniformly spaced line array by a signal which leads or lags its nearest neighbor by a fixed phase shift, $\Delta\phi$. This permits scanning a transmit and/or receive beam through a range of angles by changing its frequency. The same principle can be used to form multiple simultaneous transmit and/or receive beams. This is accomplished by transmitting a wide bandwidth signal and receiving the echoes through a spectrum analyzer. Each frequency bin of the spectrum analyzer then corresponds to a beam pointing in its own unique direction. Advantages of such a sonar system include improved cost, weight, and size versus performance for a variety of systems including ahead looking sonars and bottom mapping sonars.

56 Claims, 7 Drawing Sheets

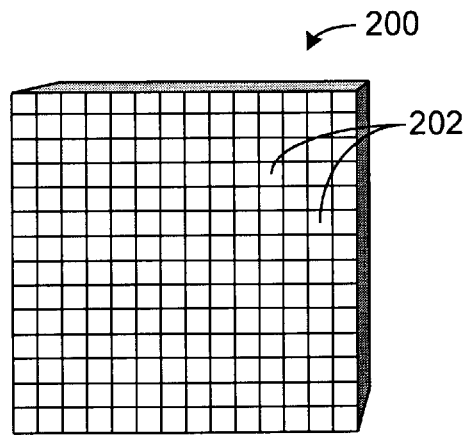
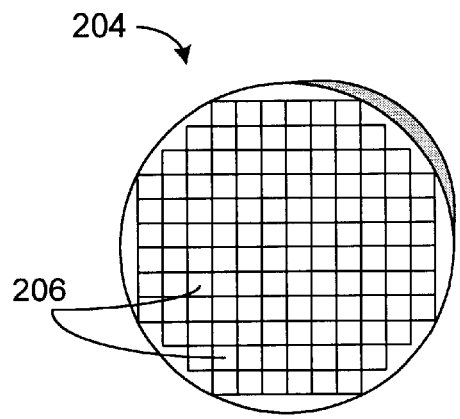
FIGURE 6A
FIGURE 6B
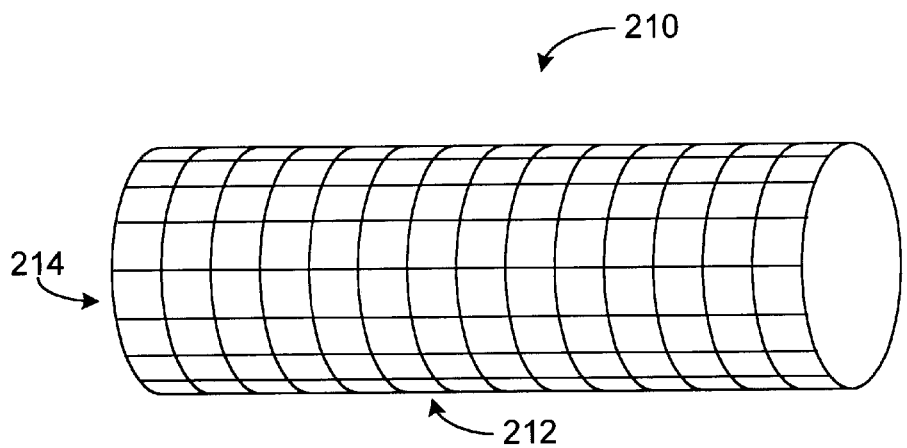
FIGURE 6C

FREQUENCY DIVISION BEAMFORMING FOR SONAR ARRAYS

RELATED APPLICATIONS

This application claims priority from U.S. Provisional Application Serial No. 60/315,579 filed Aug. 28, 2001 titled FREQUENCY DIVISION BEAMFORMING FOR SONAR ARRAYS.

BACKGROUND OF THE INVENTION

1. Field of the Invention

The invention relates to underwater sound technology and, in particular, concerns sonar systems with multiple acoustic beams being formed and steered by frequency division.

2. Description of the Related Art

Nearly all under-water vehicles, whether manned or unmanned, are equipped with an ahead-look sonar (ALS). Common applications include obstacle avoidance, mine detection, and rendezvous and docking capabilities. In general, these sonars use electronically beamformed arrays, although some use simpler systems in which multiple, separate directional hydrophones are used to provide multiple preformed beams. The electronically beamformed systems offer improved performance but are substantially more costly because of the complexities of the beamforming circuitry. A typical multi-beam sonar forms about 100 beams over an angular sector of about 150 degrees. The beamforming circuitry for this sonar requires about 100 receiver channel amplifiers to raise the received signal to a level sufficient for digital beamforming of the 100 beams. Because of this receiver amplifier complexity which is proportional to the beam resolution (beamwidth) and the number of beams formed, the multiple physical beam approach is typically limited to a relatively small number of low resolution beams and may be relatively heavy because of the excess of ceramic material in the multiple hydrophones.

Another method of forming multiple beams without an electronic beamformer is the use of an acoustic lens with a multi-element retina of small hydrophones. Although appealing in principle, lens arrays have proven difficult in practice due to issues such as temperature instability and toxicity of fluid materials and shear wave effects in solid lenses. Lens sonars also have problems in terms of the size and weight of the physical beamformer.

Thus, present beamforming techniques have practical cost, size and weight deficiencies. These are particularly important in applications such as small, low cost unmanned under-water vehicles (UUVs) where size and weight are at a premium and the cost of individual subsystems such as sonars preferably needs be kept low.

A frequency scanning technique has been used in radar for many years. Instead of fixed phase shifts between elements, however, the radar implementations use long delay lines between antenna elements or radiating slots in a dispersive delay line. The typical application is to provide vertical scanning of an array where azimuthal scanning is provided by either mechanical rotation or another electronic phase shifting technique.

Hence, there is a need for a sonar system that permits sequential scanning through multiple beams or forming multiple simultaneous acoustic beams. There is need for such sonar system to be implemented in a simple cost and size/weight effective manner.

SUMMARY OF THE INVENTION

In one aspect, the aforementioned needs are satisfied by a sonar system for forming a steerable underwater acoustic beams. The system comprises an array of acoustic transducers and a beamforming system that associates a signal to each of the transducers to form an acoustic beam with a direction. The signal is phase shifted by a selected fixed amount relative to a signal assigned to the adjacent transducer and the direction of the acoustic beam is determined by the frequency of the signals. The beamforming system is adapted to vary the frequency of the signals so as to permit steering of the acoustic beam.

In one embodiment, the beamforming system comprises a transmitter that supplies signals to the array so as to form a transmitted acoustic beam. In another embodiment, the beamforming system comprises a receiver that receives signals from the array that results from a received acoustic beam. In another embodiment, the beamforming system comprises a transmitter that supplies signals to the array so as to form a transmitted acoustic beam, and a receiver that receives signals from the array that results from a received acoustic beam.

In one embodiment, a formula $\cos\theta = (\Delta\phi/2\pi)(c/fd)$ represents a relationship between the direction of the acoustic beam and the frequency, where $\theta$ represents a direction angle relative to a plane defined by the transducers, $\Delta\phi$ represents a phase shift between adjacent acoustic transducers, c represents velocity of the acoustic beam, f represents the frequency of the signals, and d represents spacing between the adjacent transducers, wherein the phase shift $\Delta\phi$ is selected to be a substantially constant value andy the direction angle $\theta$ is varied by varying the frequency about a center frequency $f_0$. The phase shift $\Delta\phi$ is selected such that a signal associated with a given acoustic transducer is a simple linear combination of signals proportional to $\cos\omega t$ and $\sin\omega t$, where $\omega = 2\pi f$ and t represents time. In one implementation, the phase shift $\Delta\phi$ between the adjacent acoustic transducers is selected to be approximately $\pi/2$ radian such that repeating sets of four acoustic transducers can be associated by a sequence of signals proportional to $\cos\omega t$, $\sin\omega t$, $-\cos\omega t$, and $-\sin\omega t$. In another implementation, the phase shift $\Delta\phi$ between the adjacent acoustic transducers is selected to be approximately $3\pi/4$ radian such that repeating sets of eight acoustic transducers can be associated by a sequence of signals proportional to $\cos\omega t$, $-1/\sqrt{2}\cos\omega t + 1/\sqrt{2}\sin\omega t$, $-\sin\omega t$, $1/\sqrt{2}\cos\omega t + 1/\sqrt{2}\sin\omega t$, $-\cos\omega t$, $1/\sqrt{2}\cos\omega t - 1/\sqrt{2}\sin\omega t$, $\sin\omega t$, and $-1/\sqrt{2}\cos\omega t - 1/\sqrt{2}\sin\omega t$. In one implementation, the frequency f of the signals is varied in a range of approximately $0.75f_0$ to approximately $1.25f_0$.

In another aspect, the aforementioned needs are satisfied by an underwater sonar system comprising an array of acoustic transducers and a beamforming system that simultaneously associates signals with a range of frequencies to the transducers. A signal to a given transducer is phase shifted by a selected fixed amount relative to a signal assigned to the adjacent transducer. The phase shifted signals with the range of frequencies form an acoustic signal with a range of directions. A given direction of propagation within the range of directions corresponds to a specific frequency of the signals within the range of frequencies.

In one embodiment, the beamforming system comprises a broadband transmitter that simultaneously supplies signals with a range of frequencies to the array so as to form transmitted acoustic signals with a range of directions. In another embodiment, the beamforming system comprises a receiver having a spectrum analyzer that simultaneously processes signals from the array that result from received acoustic signals from a range of directions. In another embodiment, the beamforming system comprises a broadband transmitter and a receiver having a spectrum analyzer. The broadband transmitter simultaneously supplies signals with a range of frequencies to the array so as to form transmitted acoustic signals with a range of directions, and the spectrum analyzer simultaneously processes signals from the array that result from received acoustic signals from a range of directions.

A formula $\cos\theta = (\Delta\phi/2\pi)(c/fd)$ represents a relationship between the direction of the acoustic signal and the frequency, where $\theta$ represents a direction angle relative to a plane defined by the transducers, $\Delta\phi$ represents a phase shift between adjacent acoustic transducers, c represents velocity of the acoustic beam, f represents the frequency of the signals, and d represents spacing between the adjacent transducers. The phase shift $\Delta\phi$ is selected to be a substantially constant value and the direction angle $\theta$ is varied by varying the frequency f. Preferably, the phase shift $\Delta\phi$ is selected such that a signal associated with a given acoustic transducer is a simple linear combination of signals proportional to $\cos\omega t$ and $\sin\omega t$, where $\omega=2\pi f$ and t represents time. In one implementation, the phase-shift $\Delta\phi$ between the adjacent acoustic transducers is selected to be approximately $\pi/2$ radian such that repeating sets of four acoustic transducers can be associated by a sequence of signals proportional to $\cos\omega t$, $\sin\omega t$, $-\cos\omega t$, and $-\sin\omega t$. In another implementation, the phase shift $\Delta\phi$ between the adjacent acoustic transducers is selected to be approximately $3\pi/4$ radian such that repeating sets of eight acoustic transducers can be associated by a sequence of signals proportional to $\cos\omega t$, $-1/\sqrt{2}\cos\omega t + 1/\sqrt{2}\sin\omega t$, $-\sin\omega t$, $1/\sqrt{2}\cos\omega t + 1/\sqrt{2}\sin\omega t$, $-\cos\omega t$, $1/\sqrt{2}\cos\omega t - 1/\sqrt{2}\sin\omega t$, $\sin\omega t$, and $-1/\sqrt{2}\cos\omega t - 1/\sqrt{2}\sin\omega t$.

In yet another aspect, the aforementioned needs are satisfied by a method of using an underwater sonar system having an array of acoustic transducers. The method comprises associating signals having a frequency component to the transducers. A signal associated with a given transducer is phase shifted by a selected fixed amount relative to a signal assigned to the adjacent transducer such that the phase shifted signals form an acoustic beam having a direction. The method further comprises controlling the directionality of the acoustic beam by manipulating the frequency component of the signals.

In one implementation, associating the signals to the transducers comprises associating the transducers with signals with a frequency f such that a formula $\cos\theta=(\Delta\phi/2\pi)(c/fd)$ represents a relationship between the direction of the acoustic beam and the frequency, where $\theta$ represents a direction angle relative to a plane defined by the transducers, $\Delta\phi$ represents the selected fixed phase shift between adjacent acoustic transducers, c represents velocity of the acoustic beam, and d represents spacing between the adjacent transducers. Preferably, associating the signals to the transducers comprises selecting the phase shift $\Delta\phi$ such that a signal associated with a given transducer is a simple linear combination of signals proportional to $\cos\omega t$ and $\sin\omega t$, where $\omega=2\pi f$ and t represents time. The phase shift $\Delta\phi$ between the adjacent acoustic transducers may be selected to be approximately $\pi/2$ radian such that repeating sets of four acoustic transducers can be associated by a sequence of signals proportional to $\cos\omega t$, $\sin\omega t$, $-\cos\omega t$, and $-\sin\omega t$. Alternatively, the phase shift $\Delta\phi$ between the adjacent acoustic transducers may be selected to be approximately $3\pi/4$ radian such that repeating sets of eight acoustic transducers can be associated by a sequence of signals proportional to $\cos\omega t$, $-1/\sqrt{2}\cos\omega t + 1/\sqrt{2}\sin\omega t$, $-\sin\omega t$, $1/\sqrt{2}\cos\omega t + 1/\sqrt{2}\sin\omega t$, $-\cos\omega t$, $1/\sqrt{2}\cos\omega t - 1/\sqrt{2}\sin\omega t$, $\sin\omega t$, and $-1/\sqrt{2}\cos\omega t - 1/\sqrt{2}\sin\omega t$.

In one implementation, associating the signals with the transducers comprises associating a narrowband signal with the transducers and varying the frequency of the narrowband signal to change the direction of the acoustic beam. Associating the narrowband signal with the transducers may comprise supplying the narrowband signal to the transducers wherein the signal applied to the transducers results in an outgoing acoustic beam. Alternatively, associating the narrowband signal with the transducers may comprise receiving an echo signal from the transducers wherein the echo signal result from an echo that impinges on the transducers. Alternatively, associating the narrowband signal with the transducers may comprise supplying the narrowband signal to the transducers to yield an outgoing acoustic beam, and receiving an echo signal from the transducers that result from an incoming echo.

In another implementation, associating the signals with the transducers comprises associating a broadband signal having a range of frequencies with the transducers such that corresponding acoustic beams have a range of directions. Associating the broadband signal with the transducers may comprise simultaneously providing a broadband signal to the transducers so as to yield a plurality of outgoing acoustic beams having a range of directions. Alternatively, associating the broadband signal with the transducers may comprise simultaneously receiving a broadband echo signal from the transducers that result from a plurality of incoming echoes. Alternatively, associating the broadband signal with the transducers may comprise simultaneously proving a broadband signal to the transducers to yield a plurality of outgoing acoustic beams having a range of directions, and simultaneously receiving a broadband echo signal from the transducers that result from a plurality of incoming echoes.

In yet another aspect, the aforementioned needs are satisfied by a method of scanning an angular sector underwater using an array of acoustic transducers. The method comprises forming a plurality of acoustic beams wherein each acoustic beam is formed by associating signals to the array of acoustic transducers such that a signal associated a given transducer is phase shifted by a selected fixed amount relative to a signal assigned to the adjacent transducer. The direction of each acoustic beam depends on the frequency of the signals. The method further comprises varying the frequency of signals corresponding to each acoustic beam so as to vary the direction of the acoustic beam, thereby allowing the acoustic beam to sweep a range of direction angles. The frequency is selected for each acoustic beam such that resulting ranges of direction angles cover the angular sector.

In one implementation, a formula $\cos\theta=(\Delta\phi/2\pi)(c/fd)$ represents a relationship between the direction of the acoustic beam and the frequency f, where $\theta$ represents a direction angle relative to a plane defined by the transducers, $\Delta\phi$ represents the selected fixed phase shift between adjacent acoustic transducers, c represents velocity of the acoustic beam, and d represents spacing between the adjacent transducers. Preferably, the phase shift $\Delta\phi$ is selected such that a signal associated with a given transducer is a simple linear combination of signals proportional to $\cos\omega t$ and $\sin\omega t$, where $\omega=2\pi f$ and t represents time. The phase shift $\Delta\phi$ between the adjacent acoustic transducers may be selected to be approximately $\pi/2$ radian such that repeating sets of four acoustic transducers can be associated by a sequence of signals proportional to cos ωt, sin ωt, −cos ωt, and −sin ωt. Alternatively, the phase shift Δϕ between the adjacent acoustic transducers may be selected to be approximately 3π/4 radian such that repeating sets of eight acoustic transducers can be associated by a sequence of signals proportional to cos ωt, −1/√2 cos ωt+1/√2 sin ωt, −sin ωt, 1/√2 cos ωt+1/√2 sin ωt, −cos ωt, 1/√2 cos ωt−1/√2 sin ωt, sin ωt, and −1/√2 cos ωt−1/√2 sin ωt.

In one implementation, associating the signals with the transducers comprises associating a narrowband signal with the transducers and varying the frequency of the narrowband signal to sweep the acoustic beam within the range of direction angles. Associating the narrowband signal with the transducers may comprise supplying the narrowband signal to the transducers wherein the signal applied to the transducers results in an outgoing acoustic beam. Alternatively, associating the narrowband signal with the transducers may comprise receiving an echo signal from the transducers wherein the echo signal result from an echo that impinges on the transducers. Alternatively, associating the narrowband signal with the transducers may comprise supplying the narrowband signal to the transducers to yield an outgoing acoustic beam, and receiving an echo signal from the transducers that result from an incoming echo.

In yet another aspect, the aforementioned needs are satisfied by a sonar system for forming a steerable underwater acoustic beams. The system comprises an array of acoustic transducers and a beamforming system that associates a signal to each of the transducers to form an acoustic beam with a direction. The signal is phase-shifted by a selected phase relative to a signal assigned to the adjacent transducer and the direction of the acoustic beam is determined by a combination of the phase and the frequency of the signals. The beamforming system is adapted to vary the frequency of the signals for a given phase so as to permit steering of the acoustic beam.

In one embodiment, a formula cos θ=(Δϕ/2π)(c/fd) represents a relationship of the direction of the acoustic beam to phase and frequency, where θ represents a direction angle relative to a plane defined by the transducers, Δϕ represents a phase shift between adjacent acoustic transducers, c represents velocity of the acoustic beam, f represents the frequency of the signals, and d represents spacing between the adjacent transducers, wherein the phase Δϕ is selected to direct the beam in a general desired first direction, and the frequency f is varied to vary the direction of the beam about the first direction.

In one embodiment, the beamforming system comprises a transmitter that supplies signals to the array so as to form a transmitted acoustic beam. In another embodiment, the beamforming system comprises a receiver that receives signals from the array that results from a received acoustic beam. In another embodiment, the beamforming system comprises a transmitter that supplies signals to the array so as to form a transmitted acoustic beam, and a receiver that receives signals from the array that results from a received acoustic beam.

In yet another aspect, the aforementioned needs are satisfied by a method of using an underwater sonar system having an array of acoustic transducers. The method comprises associating signals having a frequency component and a phase component to the transducers. A signal associated with a given transducer is phase-shifted by a selected phase relative to a signal assigned to the adjacent transducer. The method further comprises controlling the directionality of the acoustic signal by selecting a first direction of the acoustic signal as determined by the selected phase and varying the direction of the acoustic beam about the first direction by manipulating the frequency component of the signals.

In one implementation, associating the signals to the transducers comprises associating the transducers with signals with a frequency f and a the phase Δϕ such that a formula cos θ=(Δϕ/2π)(c/fd) represents a relationship of the direction of the acoustic signal to the phase and frequency, where θ represents a direction angle relative to a plane defined by the transducers, Δϕ represents the selected phase shift between adjacent acoustic transducers, c represents velocity of the acoustic beam, and d represents spacing between the adjacent transducers.

In yet another aspect, the aforementioned needs are satisfied by a sonar system for forming a steerable underwater acoustic beams. The system comprises an array of acoustic transducers and a beamforming system having a set of beamformers. The beamformers associate a plurality of signals to the transducers to form an acoustic beam with a direction. Each of the signals is phase-shifted by a selected phase relative to a signal assigned to the adjacent transducer. The direction of the acoustic beam is determined by a combination of the phase and the frequency of the signals. The beamforming system is adapted to vary the frequency of the signals for a given phase so as to permit steering of the acoustic beam. A subset of the beamformers is connected to more than one repeating subsets of the transducers such that each beamformer associates a signal having an assigned phase and frequency to more than one transducer. This allows the total number of beamformers to be less than the number of transducers in the array.

In one embodiment, a formula cos α=(Δϕ/2π)(c/fd) represents a relationship of the direction of the acoustic beam to phase and frequency, where α represents a direction angle relative to a normal to a plane defined by the transducers, Δϕ represents a phase shift between adjacent acoustic transducers, c represents velocity of the acoustic beam, f represents the frequency of the signals, and d represents spacing between the adjacent transducers. The phase Δϕ is selected to direct the beam in a general desired first direction, and the frequency f is varied to vary the direction of the beam about the first direction. The phase Δϕ is selected to be an integral fraction of 2π radians to allow repeated duplication of signal assignments of the subset of the beamformers to the more than one subsets of the transducers.

In one embodiment, the array of transducers comprises a first line array. The spacing d is selected to be approximately half of the wavelength, and the phase Δϕ is selected as 0, π/8, π/4, and π/8 radians progressively so as to allow progressive scanning about the different first directions as determined by the selected phases. The frequency is varied at each of the selected phases by approximately 67% of bandwidth about a center frequency such that the resulting sweepings of the beam about the first directions yield a generally seamless coverage of scanning that has a range of approximately 0 to 41.8 degrees with respect to the normal.

In one embodiment, the sonar system further comprises a second line array oriented perpendicularly to the first line array so as to form a cross shape to allow scanning in two dimensions.

In one embodiment, the beamforming system comprises a transmitter that supplies signals to the array so as to form a transmitted acoustic beam. In another embodiment, the beamforming system comprises a receiver that receives signals from the array that results from a received acoustic beam. In yet another embodiment, the beamforming system comprises a transmitter that supplies signals to the array so as to form a transmitted acoustic beam, and a receiver that receives signals from the array that results from a received acoustic beam.

BRIEF DESCRIPTION OF THE DRAWINGS

FIGS. 6A–C illustrate some possible embodiments of the array, showing that the array may be flat or curved.

DETAILED DESCRIPTION OF THE PREFERRED EMBODIMENT

Figure 1:
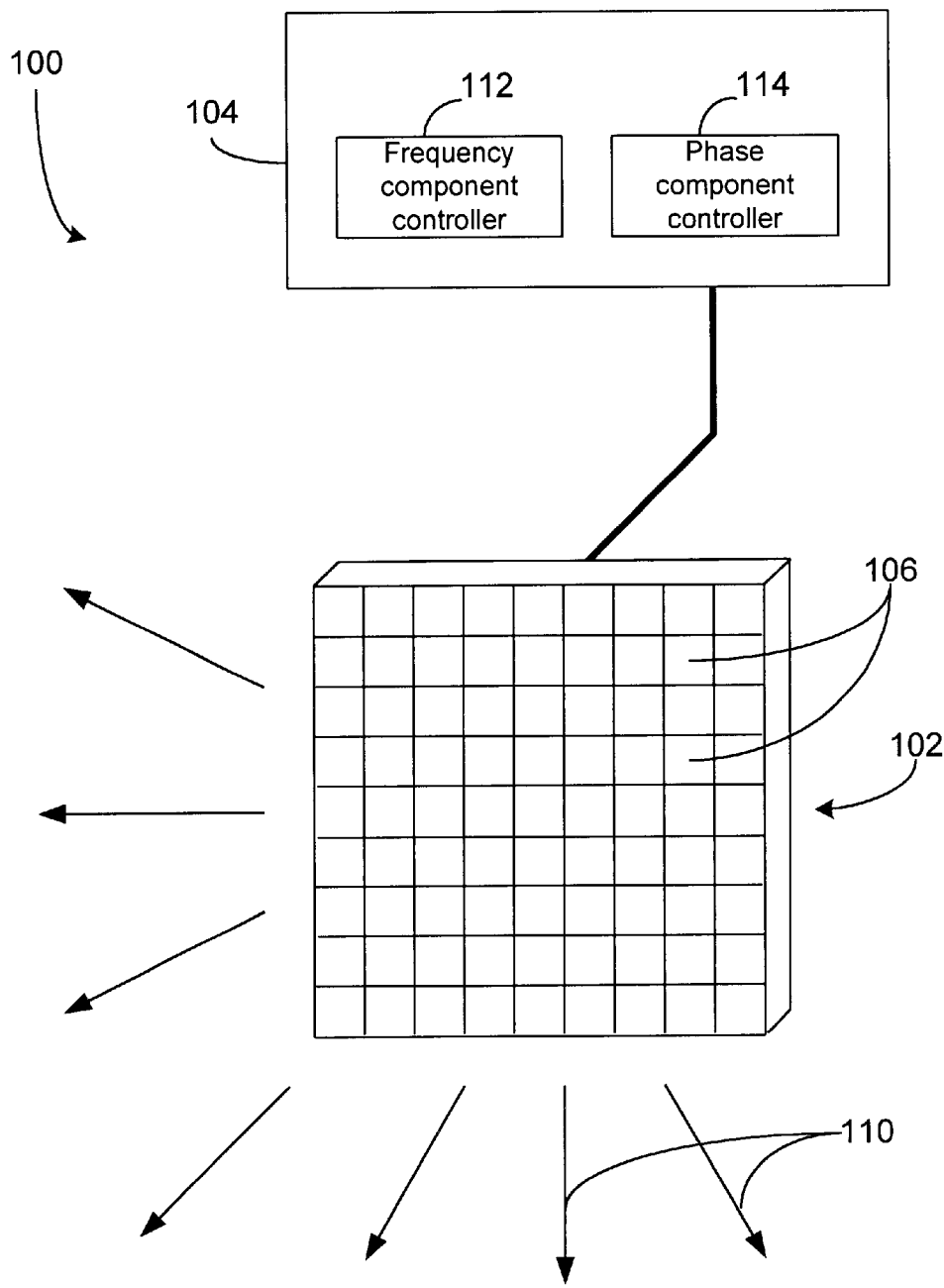
FIG. 1 illustrates a sonar system having an array of transducers driven by a frequency division beamformer to control the directionality of acoustic beams.

Reference will now be made to the drawings wherein like numerals refer to like parts throughout. The description below describes the systems and methods of frequency division beamforming and its use to form multiple transmitting and/or receiving beams for sonar applications. FIG. 1 illustrates a sonar system 100 that utilizes the frequency division beamforming method described below. The sonar system 100 comprises a transducer array 102 having a plurality of acoustic transducers 106. The acoustic transducers 106 are connected to a beamformer 104 that includes a frequency component controller 112 and a phase component controller 114. The beamformer 104 supplies the acoustic transducers 106 with signals in a manner described below such that directionality of acoustic beams that propagate from the array 102 can be controlled.

Figure 2:
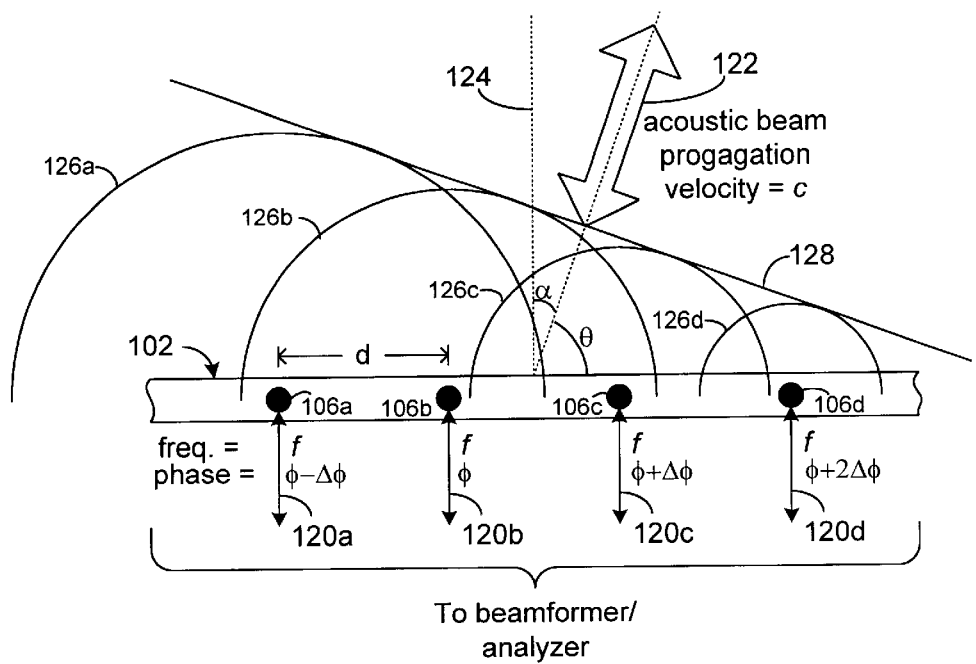
FIG. 2 illustrates an exemplary configuration and geometry of the transducers and the resulting acoustic beam.

FIG. 2 illustrates a schematic sectional view of the transducer array 102 showing the geometry of an acoustic beam 122 resulting from an application of a plurality of signals, 102. Although FIG. 2 depicts the beam 122 and a line of transducers 106 in a two dimensional plane, it will be understood that the acoustic beam may be directed along a direction out of the plane. Also, the acoustic beam 122 is depicted (by the double ended arrow) as propagating away from the array 102 or being received by the array 102. This is due to the principle of reciprocity for waves that emanate from or impinge on the transducer array 102. The description below is in context of sound waves emanating from the array, but it will be understood that the method and system are equally applicable to the reverse process of receiving of the sound waves.

The exemplary transducers 106a–d are supplied with corresponding signals 120a–d from the beamformer such that the signals 120a–d have a common frequency f and selected phases such that neighboring transducers have a phase difference of $\Delta\phi$. For example, the signal 120b has a phase of $\phi$, while the preceding 120a has a phase of $\phi-\Delta\phi$ and the following signal 120c has a phase of $\phi+\Delta\phi$. The transducers 106 are spaced apart by a spacing d. Given such a configuration, the transducers 106a–d, in response to the phased signals 120a–d, emit waves represented by respective wavefronts 126a–d. The wavefronts combine to form a plane wavefront 128 that propagates as an acoustic beam 122 having a direction angle θ with respect to a line that extends through the transducers 106. A relationship between the direction angle θ and the aforementioned signal and array parameters are described below in greater detail. Alternatively, the direction of the propagating beam may be expressed with respect to a line 124 normal to the plane of the transducers.

It will be understood that the term "beam" used herein may refer to a sound wave propagating in a well defined direction, or may also refer to a portion of a sound wave pattern wherein the portion propagates in along a given direction. Furthermore, while the acoustic beam 122 is depicted as being comprised of a plane wave, it will be understood that dispersion of the beam may occur due to various reasons. It will be appreciated, however, that for the purpose of describing the concept of controlling the directionality of the acoustic beam, such simplified illustration suffices without departing from the spirit of the invention.

Conventional beamforming applies time delays to the elements of an acoustic array which compensate for the differences in propagation time of an acoustic wave in the water. Time delay is equivalent to applying a phase shift which is a linear function of frequency to each element. In frequency division transmit beamforming, each element of a uniformly spaced line array is driven by a signal which leads or lags its nearest neighbor by a fixed phase shift, $\Delta\phi$. For frequency division receive beamforming, the received signal from each element of a uniformly spaced line array is phase shifted so it leads or lags its nearest neighbor by a fixed phase shift, $\Delta\phi$. This causes the transmitting and/or receiving beam steering direction to become a function of frequency which makes it possible to scan a transmitting and/or receiving beam through a range of angles by changing its frequency. The same principle can be used to form multiple simultaneous transmitting and/or receiving beams. This is accomplished by transmitting a wide bandwidth signal and receiving the echoes through a spectrum analyzer. Each frequency bin of the spectrum analyzer then corresponds to a beam pointing in its own unique direction.

Frequency division beamforming is practical when a bandwidth available in the transducers is substantially larger than what is required to achieve the desired range resolution. This excess bandwidth is then used for beam steering. For an echo ranging sonar, range resolution is related to bandwidth by $$\Delta R = c/2B. \tag{1}$$

For a 10 cm. (4 in.) resolution cell which would be appropriate for a typical obstacle avoidance sonar, 7.5 kHz of bandwidth would be required. In one commercially available transducer operating at 300 kHz, available bandwidth is about 150 kHz. Thus, the total bandwidth can be divided into 20 segments, each of which has the required 7.5 kHz bandwidth. Thus such a transducer has a substantial excess bandwidth which can be used for beamforming. One embodiment of the invention is an array in which the beam points in different directions at different frequencies. As long as there is 7.5 kHz of bandwidth available in any given direction, such an array can use the total 150 kHz bandwidth of the transducers to form 20 distinct beams and still achieve adequate range resolution along each beam.

To understand how frequency division transmitter beamforming works, consider first a true time delay beamformer for a uniform line array of elements with spacing, d. Each element is driven with a signal $$s_n(t)=s(t-\tau_n), \quad (2)$$

where $\tau_n=n\tau=(nd/c)\cos\theta_s$, and $\theta_s$ is the desired beam steering direction. If $s(t)=a(t)\cos\omega t$, then $s_n(t)=a(t-\tau_n)\cos\omega(t-\tau_n)$. For relatively narrow band signals, the time delay in the envelope can be ignored. The driving signals are then approximated by $s_n(t)=a(t)\cos(\omega t-n\Delta\phi)$. Ideally, $$\Delta\phi=2\pi(fd/c)\cos\theta_s. \quad (3)$$

Thus, the desired phase shift is a linear function of frequency. However, if the phase shift is selected as a fixed quantity which is independent of frequency, the beam steering direction is given by $$\cos\theta hd\ s=(\Delta\phi/2\pi)(c/fd). \quad (4)$$

Thus, as frequency increases, $\cos\theta_s$ decreases, and $\theta_s$ increases from endfire toward broadside. Assuming that the transducers have a fractional bandwidth, $\beta$, beam steering angle cover the range $$(\Delta\phi/2\pi)(c/f_0d)/(1+\beta/2)\leq\cos\theta_s\leq(\Delta\phi/2\pi)(c/f_0d)/(1-\beta/2), \quad (5)$$

where $f_0$ is the center frequency of the transducer. To avoid unwanted grating lobes, a condition can be imposed such that $d\leq\lambda/2$. Applying this criterion to the center frequency, $f_0$, leads to the inequality $$(\Delta\phi/\pi)/(1+\beta/2)\leq\cos\theta_s\leq(\Delta\phi/\pi)/(1-\beta/2), \quad (6)$$

It should also noted that for real steering angles, $\cos\theta_s\leq 1$. Therefore, $$\Delta\phi\leq\pi(1-\beta/2). \quad (7)$$

In one embodiment, the fractional bandwidth $\beta=0.5$, thus yielding $\Delta\phi\leq 3\pi/4$ or 135°.

As described above in reference to FIG. 2, direction of the beam can be alternatively expressed as an angle $\alpha$ with respect to the normal line. For such a convention, it can be readily shown that the beam directionality relationship equivalent to Equation 4 may be expressed as $\sin\alpha=(\Delta\phi/2\pi)(c/fd)$.

Figure 3:
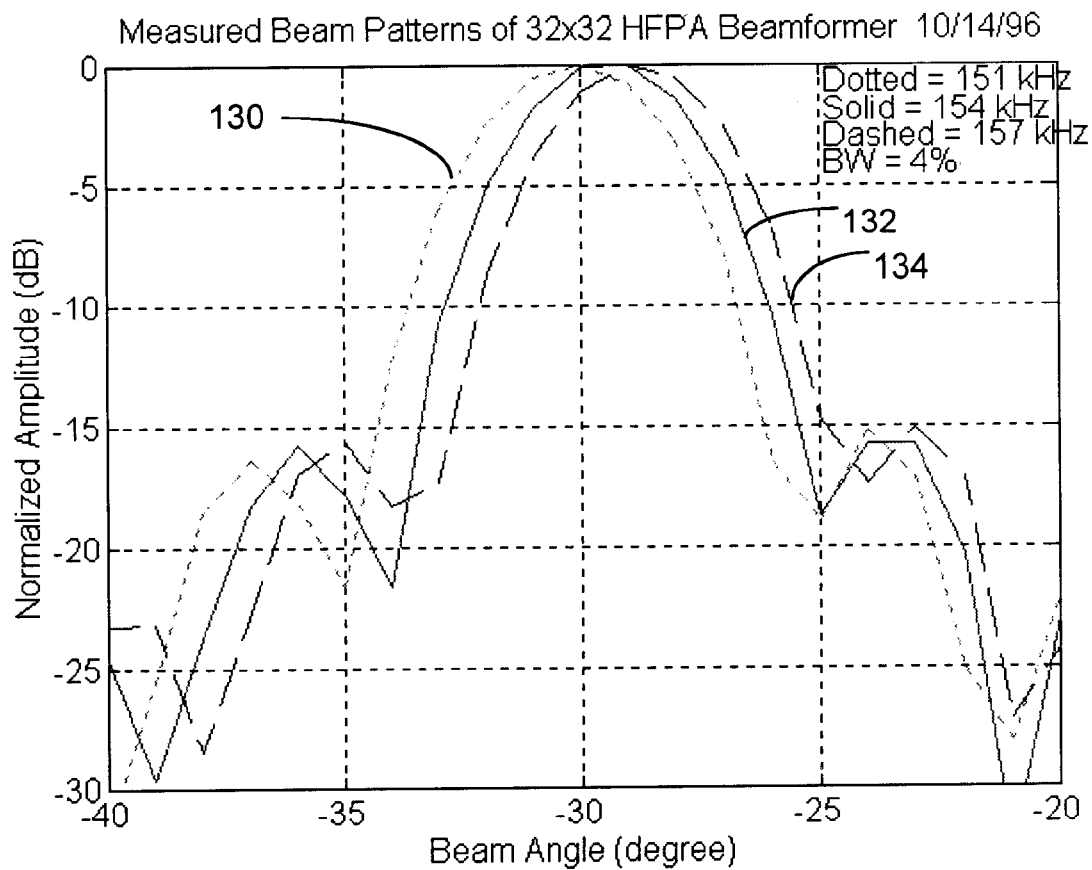
FIG. 3 illustrates an exemplary change in beam angle as frequency of driving signal is changed.

The essence of frequency division beamforming is that if each element of a uniformly spaced line array is driven by a signal which leads or lags its nearest neighbor by a fixed phase shift, $\Delta\phi$, the beam steering direction becomes a function of frequency according to Equation 4. An example of this effect is shown in FIG. 3 which illustrates the fundamental principle of operation for a one-dimensional transducer array capable of generating beams in a single plane. The transmitted frequency was varied from 151 kHz (dotted curve 130) to 157 kHz (dashed curve 134), approximately 4%, resulting in a change of beam angle from 30° to 28° relative to the normal to the array.

Consider the case of $\Delta\phi=\pi/2$ or 90°. If $d=\lambda/2$ at the center frequency, $f_0$, then the beam points 60° away from endfire (30° from normal) according to Equation 4. At the low end of the 50% passband, $f=0.75f_0$, and the beam angle is 48.2°, while at the upper end, $f=1.25f_0$, and the beam angle is 66.4°. Thus, as frequency shifts over the available bandwidth of the transducer, the beam pointing angle changes by a total of 18.2°.

One possible set of phases that can produce this effect are 0°, 90°, 180°, and 270°. This can be further simplified to only 0° and 90° and their negatives. The beamformer can be implemented by connecting every fourth element in the array in parallel which results in four distinct signal wires as shown in FIG. 2. If the four signal wires are added with imposed phase shifts of −90° between adjacent elements, the beam will be formed at a nominal 60° angle (30° from normal). Another beam can be formed at 120° (−30° relative to normal) angle by reversing the sign of the 90° imposed phase shift on the signals. As the frequency is changed, each beam will scan over the 18.2° sector as discussed above.

As previously described, the acoustic beam geometry illustrated in FIG. 2 shows a receiving/transmitting array. Because of the reciprocal nature of the acoustic field, the same principle can be used to form describe both the transmitted and received beams. In fact, the beam patterns of FIG. 3 were formed by a transmitting array.

Figure 4:
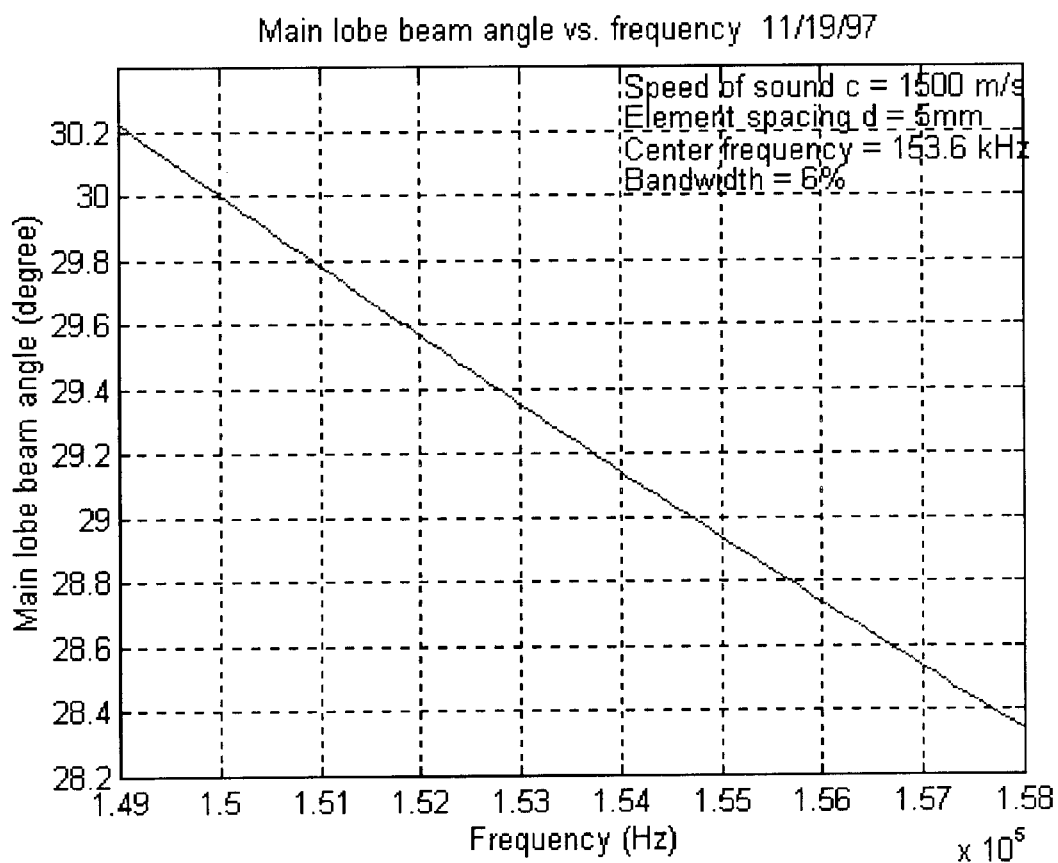
FIG. 4 illustrates an exemplary dependency of the beam angle as a function of frequency.

Another example of the expected variation of beam angle with frequency is shown in FIG. 4. In this case, the range of frequency variation is 6%, much less than what is possible using commercially available wide bandwidth transducer technology.

If instead of a single narrowband signal, a wideband signal covering the entire transducer bandwidth is transmitted, the frequency dependent nature of the beamformer will cause different portions of the spectrum to be radiated in different directions. By the reciprocal nature of the beamformer, the receiving sensitivity will also be maximized in different directions as a function of frequency. Therefore, if the four wires of FIG. 2 are appropriately phase shifted and summed, and their outputs are spectrum analyzed, each portion of the received spectrum will be equivalent to a beam pointing in a different direction.

The operating principles that have been described above for various embodiments of frequency division transmitting systems also apply to frequency division receiving systems. The frequency division techniques can be applied for the transmitter only, for the receiver only or for both the transmitter and receiver of the sonar system. When applied to the receiver system, a receive beamformer is used which applies the phase shifts to the received signals from each transducer element.

Some Possible Implementation of the Frequency Division Beamforming

Figure 5A:
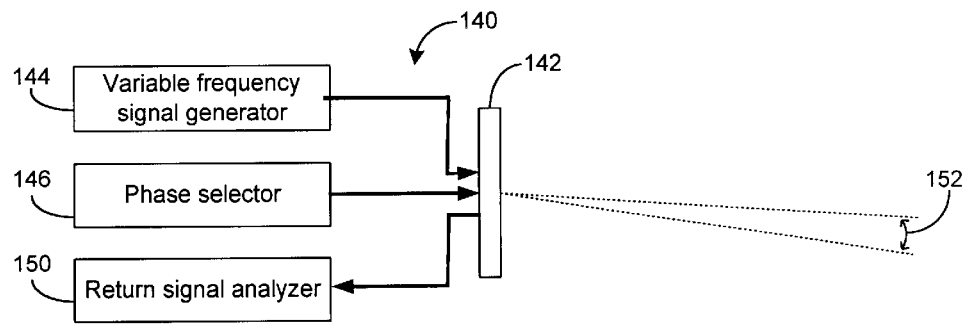
FIGS. 5A–C illustrate some possible implementations of beam steering method using frequency variation in conjunction with fixed phase differences of signals.
Figure 5B:
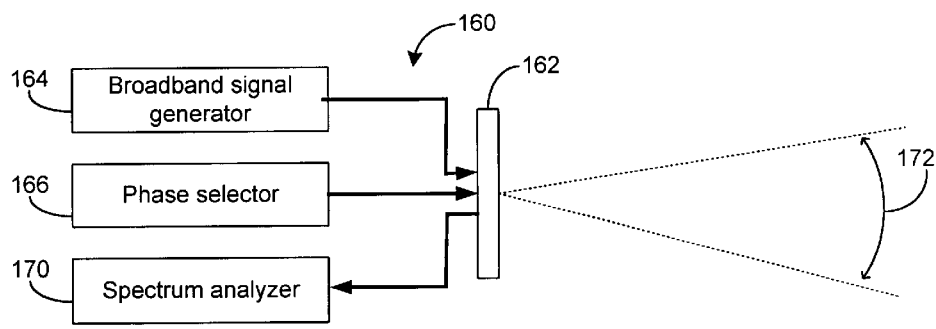
Figure 5C:
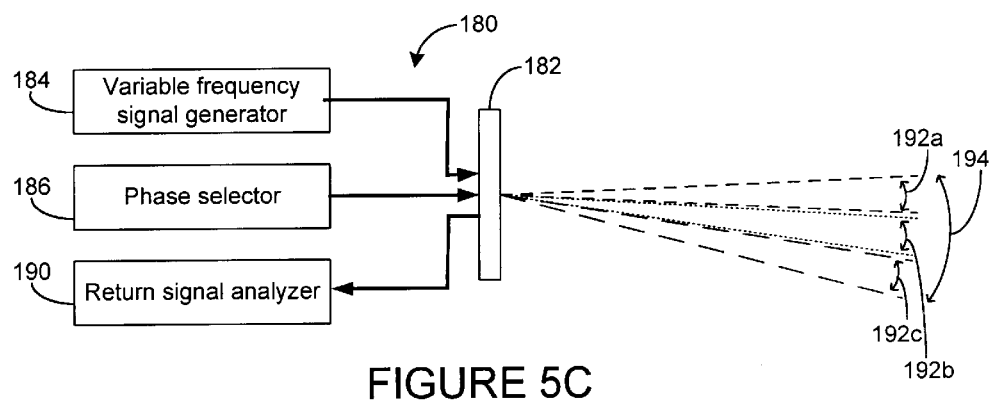

FIGS. 5A–C illustrate some possible implementations of the frequency division beamforming method described above. FIG. 5A illustrates one embodiment of a sonar system 140 having a variable frequency signal generator 144 that, in conjunction with a phase selector 146, supplies signals with fixed phase differences to the array 142. The array 142 in response to the signals transmit an acoustic beam whose direction can be varied within a range 152 by varying the frequency of the signals. In such a configuration, the beam can be thought of as a single beam whose direction at a given time is directly related to the frequency of the signals. The "sweeping" capability of the beam, i.e. the direction angle range 152 depends on the frequency varying capability of the signal generator. In one embodiment, the usable frequency variation is, as previously described in reference to FIG. 4, in the order of few percent, resulting in the angular range of few degrees. The sonar system 140 also may include a return signal analyzer 150 that analyzes the reflected acoustic signals that result from the transmitted acoustic beam.

FIG. 5B illustrates another embodiment of a sonar system 160 comprising a transducer array 162 that is supplied with signals from a broadband signal generator 164 in conjunction with a phase selector 166. The broadband signal generator 164 simultaneously provides the array 162 with signals having a range of frequencies and a fixed phase difference. The resulting acoustic signal simultaneously propagates towards a range of directions 172. A portion of the propagating acoustic signal can be considered to be a "beam". A plurality of such a beam can be separately analyzed by a spectrum analyzer 170 that divides the range of frequencies into a plurality of discreet frequency bins, thereby effectively yielding a plurality of simultaneous beams that point in different directions.

FIG. 5C illustrates an extension of the implementation described above in reference to FIG. 5A. A sonar system 180 comprises an array 182 that receives signals from a variable frequency signal generator 184 in conjunction with a phase selector 186 in a manner similar to that described above in reference to FIG. 5A. The sonar system 182 may be configured to operate at several ranges of frequencies, as depicted by beam direction ranges 192a–c. The frequency ranges may be selected such that the direction ranges 192a–c together form a larger range or an angular sector 194.

Various embodiments of the sonar system utilize a fixed phase difference in signals provided to adjacent transducer, and the direction of the acoustic beam is controlled by varying the frequency of the signals. In principle, any phase difference between the adjacent signals can be used to drive the transducers. However, certain values of the phase difference provide a substantially simpler way of driving the plurality of transducers of the array. Some of such phase difference values are described herein.

Application of the Technique to Forward Scanning Sonar

A forward looking obstacle avoidance sonar for use by swimmers or small vehicles needs to scan a narrow horizontal beam over a wide angular sector or to form multiple preformed beams in order to provide a high resolution search capability. Mechanical rotation of the transducer array is simple but slow and requires electromechanical components which may be unreliable. Multiple preformed beams using time delay and sum techniques are desirable because they provide wideband processing capabilities in many directions simultaneously. However, providing this capability at high frequencies and with large fractional bandwidths remains a difficult task even with the advances of modem electronics. Digital techniques require high sampling rates and a processor capable of high throughput. High frequency analog delay and sum methods are also complex and may experience degradation due to component variations and temperature sensitivity.

Frequency division beamforming can be used if the available bandwidth of the individual transducers in the array is substantially larger than the amount needed for adequate range resolution. This is the case for one embodiment of the transducer wherein useable bandwidth is in excess of 50% of the center frequency.

There are many methods available for using frequency division beamforming to meet the scanning and resolution requirements of typical sonar applications. The following discussion illustrates some of these considerations.

As discussed above, the use of ±90° phase shifts between elements provide one possible frequency division beamforming capability. In general, the frequency division beamforming system can use any arbitrary phase shift, $\Delta\phi$, between elements. The phase shift applied to the $n^{th}$ element is then $n\Delta\phi$ Modulo $2\pi$.

This could result in a different phase shift for every element in the array which can complicate the driving and receiving circuitry. Among desirable choices are those for which few different phases are sufficient for the entire array.

The ±90° case operated using two phases, 0° and 90°, and their negatives. There are numerous other cases which also use relatively few distinct phases for all elements. Consider the example of $\Delta\phi=3\pi/4$.

The $0^{th}$ element is driven by $\cos\omega t$.

The $1^{st}$ element by $\cos(\omega t-3\pi/4)=-1/\sqrt{2}\cos\omega t,+1/\sqrt{2}\sin\omega t$.

The $2^{nd}$ element by $\cos(\omega t-3\pi/2)=-1/\sqrt{2}\sin\omega t$.

The $3^{rd}$ element by $\cos(\omega t-9\pi/4)=1/\sqrt{2}\cos\omega t,+1/\sqrt{2}\sin\omega t$.

The $4^{th}$ element by $\cos(\omega t-3\pi)=-\cos\omega t$.

The $5^{th}$ element by $\cos(\omega t-15\pi/9)=1/\sqrt{2}\cos\omega t,-1/\sqrt{2}\sin\omega t$.

The $6^{th}$ element by $\cos(\omega t-9\pi/2)=\sin\omega t$.

The $7^{th}$ element by $\cos(\omega t-21\pi/9)=-1/\sqrt{2}\cos\omega t,-1/\sqrt{2}\sin\omega t$.

The $8^{th}$ element by $\cos(\omega t-6\pi)=\cos\omega t$.

The sequence of phases repeats after eight elements. In addition, the phases of the $4^{th}$ through $7^{th}$ elements are the negatives of the $0^{th}$ through $3^{rd}$ elements. Thus, four phases (0°±45°, and 90°) and their negatives are used to drive the entire array, regardless of the total number of elements.

Now consider the range of steering angles this phase shift can provide. Assuming $d=\lambda_o/2$, $$3/5 \leq \cos\theta_s \leq 1, \text{ and } 0° \leq \theta_s \leq 53.1°.$$

Thus, by sweeping over the 50% fractional bandwidth frequency range, the beam can be steered from endfire (0°) to 53.1°. The beamwidth will vary considerably over this range of angles. At endfire, the 3 dB beam width of a uniformly weighted array is given by $$\Delta\phi \text{ (endfire)} \approx 108°\sqrt{\lambda/Nd} \quad (8)$$

whereas well away from endfire, it is given by $$\Delta\phi \text{ (near broadside)} \approx 50.8°\lambda/(Nd \sin\theta_s). \quad (9)$$

Consider an array which is 60λ (thus making N=120) at the center frequency. Table 1 lists the beamwidth and steering angle for various frequencies for this array assuming 135° phase shifts between elements.

TABLE 1

| | Steering angles and beam widths vs. frequency for d = λo/2 | |
|---|---|---|
| f/f$_o$ | θ$_s$ | Δθ |
| .75 | 0° | 16.1 |
| 1.0 | 41.4° | 1.3° |
| 1.25 | 53.1 | 0.9° |

This design allows the beam to steer over a wide angular range (0°–53.1°), but the beam becomes broad near endfire which reduces cross-range resolution in that direction.

Consider an alternate design in which the elements are spaced slightly apart. Let $d=\lambda_0/\sqrt{3}=0.577\lambda_0$. Table 2 shows the steering angles and beam widths case. This approach reduces the scanning range

TABLE 2

Steering angles and beam widths vs.
frequency for $d = \lambda_0/\sqrt{3}$

| $f/f_0$ | $\theta_s$ | $\Delta\theta$ |
|---|---|---|
| .75 | 30° | 3.91 |
| 1.0 | 49.5° | 1.93° |
| 1.25 | 58.7 | 1.37° | to only 28.7°, but results in a beamwidth which varies by less than a factor of 3 as opposed to a factor of 18.

The range of angles which can be scanned versus inter-element phase shift and the number of distinct phases used are shown in Table 3. The spacing is assumed to be $\lambda_0/2$ in all cases. As seen above, changing d can move the sectors slightly.

TABLE 3

Scanning range and no. of phases vs. phase shift

| $\Delta\phi$ | $\theta_{min}$ | $\theta_{max}$ | $\Delta\theta_s$ | No of phases |
|---|---|---|---|---|
| 0° | 90° | 90° | 0° | 1 |
| 30° | 77.2 | 82.3 | 5.1 | 6 |
| 45° | 70.5 | 78.5 | 8.0° | 4 |
| 60° | 63.6 | 74.5 | 11.1 | 3 |
| 90° | 48.2 | 66.4 | 18.20 | 2 |
| 120° | 27.3 | 57.8 | 30.5 | 3 |
| 135 | 0 | 53.1 | 53.1 | 4 |

It will be noted that the principal limitation of this technique is the relatively limited angular scanning region which is achievable with a specific phase shift even given the 50% fractional bandwidth transducers. However, if three sets of phase shifts, say 60°, 90°, and 120° are provided, the scanning could cover a range of 47.2° from 27.3° to 74.5°. In addition, four phases, 0°, 60°, 90°, and 120°, and their negatives are used for all these cases. Different interconnections to the elements can be adapted to implement such a system.

It will also noted that for a line array, a set of beams symmetrical about broadside can also be formed by reversing the sign of the phase shift between elements. Furthermore, the broadside beam can be formed by directly summing all elements with no phase shift. Thus, such arrangement can get coverage over two substantially symmetrical sectors at 15.5° to 62.7° away from broadside plus a single beam at broadside in a relatively simple manner. The location of these angular sectors can be modified slightly by changing the element spacing. However, there remains a problem in filling in the gaps of approximately 15° on either side of broadside. This poses a challenge in using this type of beamforming in a forward looking array. If, on the other hand, a pair of arrays were used in a quasi-side scan configuration but with the axis of each array rotated by 27° relative to the fore-aft axis of the platform, the combination could provide both forward scan and side scan capabilities. There is full coverage of angles from dead ahead (0°) to ±47° which is a reasonable forward scan sector. Then there is coverage from about 79° to 126° on either side which could be used for either single or multiple beam side scan coverage. Thus, there are numerous ways to exploit the capability of frequency division beamforming for various applications.

Some Possible Embodiments of the Transducer Array

Having described the frequency division beamformer above, some possible embodiments of the transducer arrays that can be used in conjunction with the beamformer are now described. As illustrated in FIGS. 6A–C, transducers may be arranged on a flat surface or a curved surface. The flat surface array is exemplified by a rectangular face flat array 200 and a circular face flat array 204. Specifically, the rectangular face flat array 200 comprises a plurality of transducers 202 arranged in a regular pattern. Similarly, the circular face flat array 204 comprises a plurality of transducers 206 arranged in a regular pattern. While two exemplary flat arrays are illustrated in FIGS. 6A–B, it will be appreciated that the flat array may be configured to have any number of shapes and be used in conjunction with the beamformer without departing from the spirit of the invention.

FIG. 6C illustrates one possible example of the curved surface array. A cylindrical surface array 210 comprises transducers arranged in a plurality of longitudinal and/or circumferential bands 214 and 212. In one embodiment, the transducers arranged in the circumferential bands 212 are supplied with signals that are adapted to account for the relative orientations imposed by the curved surface. Such a cylindrical array can provide a substantial solid angle of coverage by having the acoustic beam sweep both along the circumferential direction as well as the longitudinal direction. In particular, the circumferential range of sweep can be enhanced by the natural curvature of the array. While the cylindrical array is described as an exemplary curved surface array, it will be appreciated that the curved surface array may have any number of shapes and contours and be used in conjunction with the beamformer without departing from the spirit of the invention.

In one embodiment, the frequency division beamformer may also be used to scan the acoustic beam in two dimensions. A two dimensional beamforming technique using a single planar array is disclosed in U.S. Pat. No. 5,808,967 titled "Two-Dimensional Array Transducer and Beamformer", and is hereby incorporated by reference in it entirety.

Scanning by Combination of Phase and Frequency

Figure 7A:
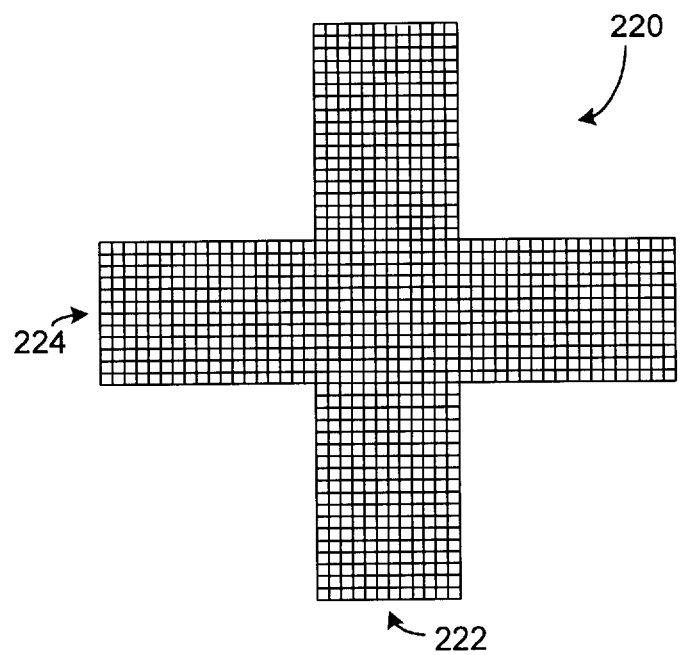
FIGS. 7A–B illustrate another embodiment of the array, a cross shaped array that permits scanning in two orthogonal directions.

FIG. 7A illustrates one embodiment of the transducer array that, along with the beamformer, allows scanning along two orthogonal axes in a manner described below. A cross shaped array 220 comprises a plurality of transducers arranged on a horizontal strip 224 and a vertical strip 222 such that the two strips overlap at the center. The vertical strip is provided with narrow band signals with varying frequency to produce a generally vertically scanning acoustic beam, and similarly, the horizontal strip produces a generally horizontally scanning acoustic beam.

In one aspect, the vertical and horizontal scanning is performed by having the beamformer provide signals with a fixed phase value between the adjacent transducers, as described above. The range of scanning is then limited by the range of the frequency of the signals being provided to the transducers.

In another aspect, the beamformer can be adapted to provide signals with different phase values to the adjacent transducers. As seen in the phase array equation $\sin \alpha = (\Delta\phi/2\pi)(c/fd)$, the direction angle $\alpha$ can be made to depend on the phase $\Delta\phi$. Thus by combining the beam direction's dependence of the phase and the frequency, a relatively large angular sector can be scanned in a manner described below.

Figure 7B:
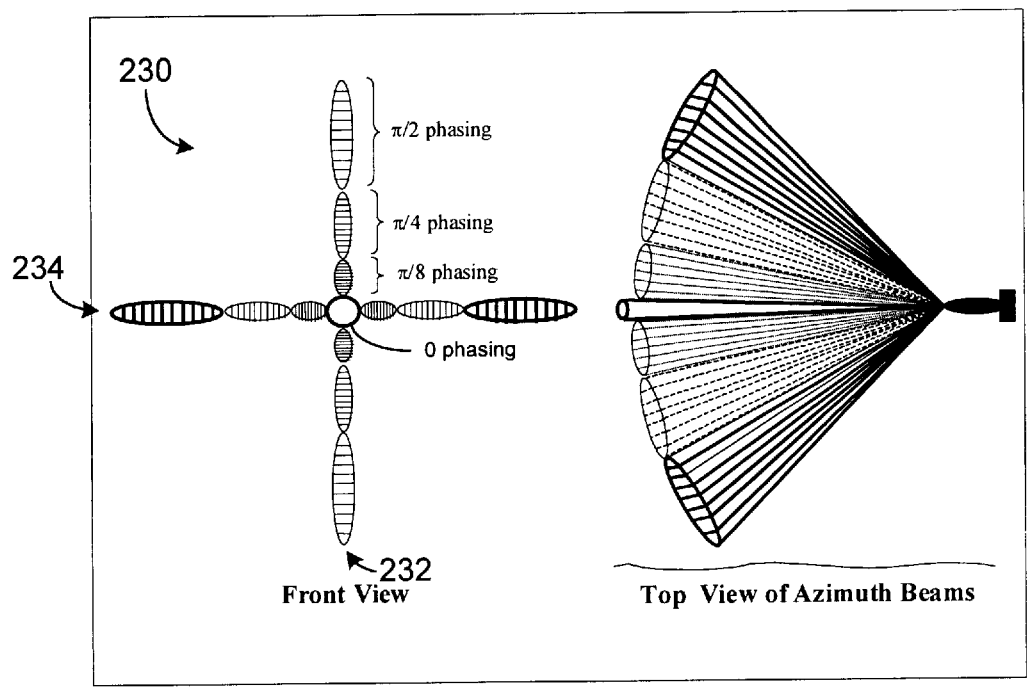

FIG. 7B illustrates one possible implementation of varying both the phase and the frequency to generate a scan pattern 230. A generally vertical scan pattern 232 is achieved by beams from the vertical strip 222, and a generally horizontal scan pattern 234 is achieved by beams from the horizontal strip 224. The beamformer may be adapted to provide different sets of phase to the signals. For example, a zero phasing ($\Delta\phi=0$) yields a beam pattern that is normal to the face of the array ($\alpha=0$). A phase of $\pi/8$ yields a beam that, for a given frequency, has a greater angle $\alpha$. Thus by varying the frequency of the signals of the $\pi/8$ set, a range of direction angle can be scanned. As shown in FIG. 7B, higher value sets of phases $\pi/4$ and $\pi/2$, in conjunction with their respective frequency ranges, yield adjacent ranges of scans. Table 4 lists the aforementioned angle ranges possible for two different bandwidth settings.

TABLE 4

A few example angle ranges for different phase shifts and bandwidths

| Phase Shift Applied (rad) | 50% Bandwidth Minimum Angle (deg) | 50% Bandwidth Maximum Angle (deg) | 67% Bandwidth Minimum Angle (deg) | 67% Bandwidth Maximum Angle (deg) |
|---|---|---|---|---|
| $\pi/2$ | 19.5 | 33.7 | 19.5 | 41.8 |
| $\pi/4$ | 9.6 | 16.1 | 9.6 | 19.5 |
| $\pi/8$ | 4.7 | 8.0 | 4.8 | 9.6 |

The bandwidth fraction is defined above in reference to Equation 7.

As seen in Table 4, the beam direction ranges associated with the 50% band with leave slight gaps between the phase set ranges. By utilizing a higher bandwidth of 67%, however, such gaps are removed as the phase set ranges form a continuing coverage.

Although the foregoing description has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions, but should be defined by the appended claims.

What is claimed is:

1. A sonar system for forming a steerable underwater acoustic beam, the system comprising:
    an array of acoustic transducers; and
    a beamforming system that associates a signal to each of the transducers to form an acoustic beam with a direction wherein the signal is phase shifted by a selected fixed amount relative to a signal assigned to the adjacent transducer and wherein the direction of the acoustic beam is determined by the frequency of the signals, wherein the beamforming system is adapted to vary the frequency of the signals so as to permit steering of the acoustic beam.

2. The sonar system of claim 1, wherein the beamforming system comprises a transmitter that supplies signals to the array so as to form a transmitted acoustic beam.

3. The sonar system of claim 1, wherein the beamforming system comprises a receiver that receives signals from the array that results from a received acoustic beam.

4. The sonar system of claim 1, wherein the beamforming system comprises a transmitter that supplies signals to the array so as to form a transmitted acoustic beam, and a receiver that receives signals from the array that results from a received acoustic beam.

5. The sonar system of claim 1, wherein a formula $\cos\theta=(\Delta\phi/2\pi)(c/fd)$ represents a relationship between the direction of the acoustic beam and the frequency, where $\theta$ represents a direction angle relative to a plane defined by the transducers, $\Delta\phi$ represents a phase shift between adjacent acoustic transducers, c represents velocity of the acoustic beam, f represents the frequency of the signals, and d represents spacing between the adjacent transducers, wherein the phase shift $\Delta\phi$ is selected to be a substantially constant value and the direction angle $\theta$ is varied by varying the frequency f about a center frequency $f_0$.

6. The sonar system of claim 5, wherein the phase shift $\Delta\phi$ is selected such that a signal associated with a given acoustic transducer is a simple linear combination of signals proportional to $\cos\omega t$ and $\sin\omega t$, where $\omega=2\pi f$ and t represents time.

7. The sonar system of claim 6, wherein the phase shift $\Delta\phi$ between the adjacent acoustic transducers is selected to be approximately $\pi/2$ radian such that repeating sets of four acoustic transducers can be associated by a sequence of signals proportional to $\cos\omega t$, $\sin\omega t$, $-\cos\omega t$, and $-\sin\omega t$.

8. The sonar system of claim 6, wherein the phase shift $\Delta\phi$ between the adjacent acoustic transducers is selected to be approximately $3\pi/4$ radian such that repeating sets of eight acoustic transducers can be associated by a sequence of signals proportional to $\cos\omega t$, $-1/\sqrt{2}\cos\omega t+1/\sqrt{2}\sin\omega t$, $-\sin\omega t$, $1/\sqrt{2}\cos\omega t+1/\sqrt{2}\sin\omega t$, $-\cos\omega t$, $1/\sqrt{2}\cos\omega t-1/\sqrt{2}\sin\omega t$, $\sin\omega t$, and $-1/\sqrt{2}\cos\omega t-1/\sqrt{2}\sin\omega t$.

9. The sonar system of claim 6, wherein the frequency f of the signals is varied in a range of approximately $0.75f_0$ to approximately $1.25f_0$.

10. An underwater sonar system comprising:
    an array of acoustic transducers; and
    a beamforming system that simultaneously associates signals with a range of frequencies to the transducers wherein a signal to a given transducer is phase shifted by a selected fixed amount relative to a signal assigned to the adjacent transducer, wherein the phase shifted signals with the range of frequencies form an acoustic signal with a range of directions, wherein a given direction within the range of directions corresponds to a specific frequency of the signals within the range of frequencies.

11. The sonar system of claim 10, wherein the beamforming system comprises a broadband transmitter that simultaneously supplies signals with a range of frequencies to the array so as to form transmitted acoustic signals with a range of directions.

12. The sonar system of claim 10, wherein the beamforming system comprises a receiver having a spectrum analyzer that simultaneously processes signals from the array that result from received acoustic signals from a range of directions.

13. The sonar system of claim 10, wherein the beamforming system comprises a broadband transmitter and a receiver having a spectrum analyzer wherein the broadband transmitter simultaneously supplies signals with a range of frequencies to the array so as to form transmitted acoustic signals with a range of directions and wherein the spectrum analyzer simultaneously processes signals from the array that result from received acoustic signals from a range of directions.

14. The sonar system of claim 10, wherein a formula $\cos\theta=(\Delta\phi/2\pi)(c/fd)$ represents a relationship between the direction of the acoustic signal and the frequency, where $\theta$ represents a direction angle relative to a plane defined by the transducers, $\Delta\phi$ represents a phase shift between adjacent acoustic transducers, c represents velocity of the acoustic beam, f represents the frequency of the signals, and d represents spacing between the adjacent transducers, wherein the phase shift $\Delta\phi$ is selected to be a substantially constant value and the direction angle $\theta$ is varied by varying the frequency f.

15. The sonar system of claim 14, wherein the phase shift $\Delta\phi$ is selected such that a signal associated with a given acoustic transducer is a simple linear combination of signals proportional to cos $\omega$t and sin $\omega$t, where $\omega=2\pi f$ and t represents time.

16. The sonar system of claim 15, wherein the phase shift $\Delta\phi$ between the adjacent acoustic transducers is selected to be approximately $\pi/2$ radian such that repeating sets of four acoustic transducers can be associated by a sequence of signals proportional to cos $\omega$t, sin $\omega$t, –cos $\omega$t, and –sin $\omega$t.

17. The sonar system of claim 15, wherein the phase shift $\Delta\phi$ between the adjacent acoustic transducers is selected to be approximately $3\pi/4$ radian such that repeating sets of eight acoustic transducers can be associated by a sequence of signals proportional to cos $\omega$t, $-1/\sqrt{2}$ cos $\omega$t+$1/\sqrt{2}$ sin $\omega$t, –sin $\omega$t, $1/\sqrt{2}$ cos $\omega$t+$1/\sqrt{2}$ sin $\omega$t, –cos $\omega$t, $1/\sqrt{2}$ cos $\omega$t–$1/\sqrt{2}$ sin $\omega$t, sin $\omega$t, and $-1/\sqrt{2}$ cos $\omega$t–$1/\sqrt{2}$ sin $\omega$t.

18. A method of using an underwater sonar system having an array of acoustic transducers, the method comprising:

associating signals having a frequency component to the transducers wherein a signal associated with a given transducer is phase shifted by a selected fixed amount relative to a signal assigned to the adjacent transducer such that the phase shifted signals form an acoustic beam having a direction; and controlling the directionality of the acoustic beam by manipulating the frequency component of the signals.

19. The method of claim 18, wherein associating the signals to the transducers comprises associating the transducers with signals with a frequency f such that a formula cos $\theta=(\Delta\phi/2\pi)(c/fd)$ represents a relationship between the direction of the acoustic beam and the frequency, where $\theta$ represents a direction angle relative to a plane defined by the transducers, $\Delta\phi$ represents the selected fixed phase shift between adjacent acoustic transducers, c represents velocity of the acoustic beam, and d represents spacing between the adjacent transducers.

20. The method of claim 19, wherein associating the signals to the transducers comprises selecting the phase shift $\Delta\phi$ such that a signal associated with a given transducer is a simple linear combination of signals proportional to cos $\omega$t and sin $\omega$t, where $\omega=2\pi f$ and t represents time.

21. The method of claim 20, wherein the phase shift $\Delta\phi$ between the adjacent acoustic transducers is selected to be approximately $\pi/2$ radian such that repeating sets of four acoustic transducers can be associated by a sequence of signals proportional to cos $\omega$t, sin $\omega$t, –cos $\omega$t, and –sin $\omega$t.

22. The method of claim 20, wherein the phase shift $\Delta\phi$ between the adjacent acoustic transducers is selected to be approximately $3\pi/4$ radian such that repeating sets of eight acoustic transducers can be associated by a sequence of signals proportional to cos $\omega$t, $-1/\sqrt{2}$ cos $\omega$t+$1/\sqrt{2}$ sin $\omega$t, –sin $\omega$t, $1/\sqrt{2}$ cos $\omega$t+$1/\sqrt{2}$ sin $\omega$t, –cos $\omega$t, $1/\sqrt{2}$ cos $\omega$t–$1/\sqrt{2}$ sin $\omega$t, sin $\omega$t, and $-1/\sqrt{2}$ cos $\omega$t–$1/\sqrt{2}$ sin $\omega$t.

23. The method of claim 19, wherein associating the signals with the transducers comprises associating a narrowband signal with the transducers and varying the frequency of the narrowband signal to change the direction of the acoustic beam.

24. The method of claim 23, wherein associating the narrowband signal with the transducers comprises supplying the narrowband signal to the transducers wherein the signal applied to the transducers results in an outgoing acoustic beam.

25. The method of claim 23, wherein associating the narrowband signal with the transducers comprises receiving an echo signal from the transducers wherein the echo signal result from an echo that impinges on the transducers.

26. The method of claim 23, wherein associating the narrowband signal with the transducers comprises supplying the narrowband signal to the transducers to yield an outgoing acoustic beam, and receiving an echo signal from the transducers that result from an incoming echo.

27. The method of claim 19, wherein associating the signals with the transducers comprises associating a broadband signal having a range of frequencies with the transducers such that corresponding acoustic beams have a range of directions.

28. The method of claim 27, wherein associating the broadband signal with the transducers comprises simultaneously providing a broadband signal to the transducers so as to yield a plurality of outgoing acoustic beams having a range of directions.

29. The method of claim 27, wherein associating the broadband signal with the transducers comprises simultaneously receiving a broadband echo signal from the transducers that result from a plurality of incoming echoes.

30. The method of claim 27, wherein associating the broadband signal with the transducers comprises simultaneously proving a broadband signal to the transducers to yield a plurality of outgoing acoustic beams having a range of directions, and simultaneously receiving a broadband echo signal from the transducers that result from a plurality of incoming echoes.

31. A method of scanning an angular sector underwater using an array of acoustic transducers, the method comprising:

forming a plurality of acoustic beams wherein each acoustic beam is formed by associating signals to the array of acoustic transducers such that a signal associated with a given transducer is phase shifted by a selected fixed amount relative to a signal assigned to the adjacent transducer and wherein the direction of each acoustic beam depends on the frequency of the signals; and varying the frequency of signals corresponding to each acoustic beam so as to vary the direction of the acoustic beam, thereby allowing the acoustic beam to sweep a range of direction angles and wherein the frequency is selected for each acoustic beam such that resulting ranges of direction angles cover the angular sector.

32. The method of claim 31, wherein a formula cos $\theta=(\Delta\phi/2\pi)(c/fd)$ represents a relationship between the direction of the acoustic beam and the frequency f, where $\theta$ represents a direction angle relative to a plane defined by the transducers, $\Delta\phi$ represents the selected fixed phase shift between adjacent acoustic transducers, c represents velocity of the acoustic beam, and d represents spacing between the adjacent transducers.

33. The method of claim 32, wherein the phase shift $\Delta\phi$ is selected such that a signal associated with a given transducer is a simple linear combination of signals proportional to cos $\omega$t and sin $\omega$t, where $\omega=2\pi f$ and t represents time.

34. The method of claim 33, wherein the phase shift $\Delta\phi$ between the adjacent acoustic transducers is selected to be approximately $\pi/2$ radian such that repeating sets of four acoustic transducers can be associated by a sequence of signals proportional to cos $\omega$t, sin $\omega$t, –cos $\omega$t, and –sin $\omega$t.

35. The method of claim 33, wherein the phase shift $\Delta\phi$ between the adjacent acoustic transducers is selected to be approximately $3\pi/4$ radian such that repeating sets of eight acoustic transducers can be associated by a sequence of signals proportional to cos ωt, $-1/\sqrt{2}$ cos ωt+$1/\sqrt{2}$ sin ωt, $-$sin ωt, $1/\sqrt{2}$ cos ωt+$1/\sqrt{2}$ sin ωt, $-$cos ωt, $1/\sqrt{2}$ cos ωt$-1/\sqrt{2}$ sin ωt, sin ωt, and $-1/\sqrt{2}$ cos ωt$-1/\sqrt{2}$ sin ωt.

36. The method of claim 32, wherein associating the signals with the transducers comprises associating a narrowband signal with the transducers and varying the frequency of the narrowband signal to sweep the acoustic beam within the range of direction angles.

37. The method of claim 36, wherein associating the narrowband signal with the transducers comprises supplying the narrowband signal to the transducers wherein the signal applied to the transducers results in an outgoing acoustic beam.

38. The method of claim 36, wherein associating the narrowband signal with the transducers comprises receiving an echo signal from the transducers wherein the echo signal result from an echo that impinges on the transducers.

39. The method of claim 36, wherein associating the narrowband signal with the transducers comprises supplying the narrowband signal to the transducers to yield an outgoing acoustic beam, and receiving an echo signal from the transducers that result from an incoming echo.

40. A sonar system for forming a steerable underwater acoustic beams, the system comprising:
an array of acoustic transducers; and
a beamforming system that associates a signal to each of the transducers to form an acoustic beam with a direction wherein the signal is phase-shifted by a selected phase relative to a signal assigned to the adjacent transducer and wherein the direction of the acoustic beam is determined by a combination of the phase and the frequency of the signals, wherein the beamforming system is adapted to vary the frequency of the signals for a given phase so as to permit steering of the acoustic beam.

41. The sonar system of claim 40, wherein a formula cos θ=($\Delta\phi/2\pi$)(c/fd) represents a relationship of the direction of the acoustic beam to phase and frequency, where θ represents a direction angle relative to a plane defined by the transducers, $\Delta\phi$ represents a phase shift between adjacent acoustic transducers, c represents velocity of the acoustic beam, f represents the frequency of the signals, and d represents spacing between the adjacent transducers, wherein the phase $\Delta\phi$ is selected to direct the beam in a general desired first direction, and the frequency f is varied to vary the direction of the beam about the first direction.

42. The sonar system of claim 41, wherein the beamforming system comprises a transmitter that supplies signals to the array so as to form a transmitted acoustic beam.

43. The sonar system of claim 41, wherein the beamforming system comprises a receiver that receives signals from the array that results from a received acoustic beam.

44. The sonar system of claim 41, wherein the beamforming system comprises a transmitter that supplies signals to the array so as to form a transmitted acoustic beam, and a receiver that receives signals from the array that results from a received acoustic beam.

45. A method of using an underwater sonar system having an array of acoustic transducers, the method comprising:
associating signals having a frequency component and a phase component to the transducers wherein a signal associated with a given transducer is phase-shifted by a selected phase relative to a signal assigned to the adjacent transducer; and
controlling the directionality of the acoustic signal by selecting a first direction of the acoustic signal as determined by the selected phase and varying the direction of the acoustic beam about the first direction by manipulating the frequency component of the signals.

46. The method of claim 45, wherein associating the signals to the transducers comprises associating the transducers with signals with a frequency f and a the phase $\Delta\phi$ such that a formula cos θ=($\Delta\phi/2\pi$)(c/fd) represents a relationship of the direction of the acoustic signal to the phase and frequency, where θ represents a direction angle relative to a plane defined by the transducers, $\Delta\phi$ represents the selected phase shift between adjacent acoustic transducers, c represents velocity of the acoustic beam, and d represents spacing between the adjacent transducers.

47. A sonar system for forming a steerable underwater acoustic beams, the system comprising:
an array of acoustic transducers;
a beamformning system having a set of beamformers wherein the beamformers associate a plurality of signals to the transducers to form an acoustic beam with a direction wherein each of the signals is phase-shifted by a selected phase relative to a signal assigned to the adjacent transducer and wherein the direction of the acoustic beam is determined by a combination of the phase and the frequency of the signals, wherein the beamforming system is adapted to vary the frequency of the signals for a given phase so as to permit steering of the acoustic beam; and
wherein a subset of the beamformers is connected to more than one repeating subsets of the transducers such that each beamformer associates a signal having an assigned phase and frequency to more than one transducer, thereby allowing the total number of beamformers to be less than the number of transducers in the array.

48. The sonar system of claim 47, wherein a formula cos α=($\Delta\phi/2\pi$)(c/fd) represents a relationship of the direction of the acoustic beam to phase and frequency, where α represents a direction angle relative to a normal to a plane defined by the transducers, $\Delta\phi$ represents a phase shift between adjacent acoustic transducers, c represents velocity of the acoustic beam, f represents the frequency of the signals, and d represents spacing between the adjacent transducers, wherein the phase $\Delta\phi$ is selected to direct the beam in a general desired first direction, and the frequency f is varied to vary the direction of the beam about the first direction.

49. The sonar system of claim 48, wherein the phase $\Delta\phi$ is selected to be an integral fraction of $2\pi$ radians to allow repeated duplication of signal assignments of the subset of the beamformers to the more than one subsets of the transducers.

50. The sonar system of claim 49, wherein the array of transducers comprises a first line array.

51. The sonar system of claim 50, wherein the spacing d is selected to be approximately half of the wavelength, and the phase $\Delta\phi$ is selected as 0, $\pi/8$, $\pi/4$, and $\pi/8$ radians progressively so as to allow progressive scanning about the different first directions as determined by the selected phases.

52. The sonar system of claim 51, wherein the frequency is varied at each of the selected phases by approximately 67% of bandwidth about a center frequency such that the resulting sweepings of the beam about the first directions yield a generally seamless coverage of scanning that has a range of approximately 0 to 41.8 degrees with respect to the normal.

53. The sonar system of claim 50, further comprising a second line array oriented perpendicularly to the first line array so as to form a cross shape to allow scanning in two dimensions.

54. The sonar system of claim 49, wherein the beamforming system comprises a transmitter that supplies signals to the array so as to form a transmitted acoustic beam.

55. The sonar system of claim 49, wherein the beamforming system comprises a receiver that receives signals from the array that results from a received acoustic beam.

56. The sonar system of claim 49, wherein the beamforming system comprises a transmitter that supplies signals to the array so as to form a transmitted acoustic beam, and a receiver that receives signals from the array that results from a received acoustic beam.

\* \* \* \* \*